United States Patent [19]

Engeler et al.

[11] Patent Number: 4,559,821
[45] Date of Patent: Dec. 24, 1985

[54] HIGH PRESSURE TRANSDUCER

[75] Inventors: Paul Engeler, Frauenfeld; Peter Wolfer, Andelfingen, both of Switzerland

[73] Assignee: Kistler Instrumente A.G., Winterthur, Switzerland

[21] Appl. No.: 481,881

[22] Filed: Apr. 4, 1983

[30] Foreign Application Priority Data

Apr. 6, 1982 [EP] European Pat. Off. ........ 82102929.5

[51] Int. Cl.[4] .............................................. G01L 9/08
[52] U.S. Cl. ....................................... 73/167; 73/723; 73/727; 73/756
[58] Field of Search .................. 73/35, 167, 723, 724, 73/725, 726, 727, 728, 756; 338/42

[56] References Cited

U.S. PATENT DOCUMENTS

| | | | |
|---|---|---|---|
| 2,629,801 | 2/1953 | Warshaw | 73/726 |
| 3,225,859 | 12/1965 | Davidson | 73/726 |
| 3,247,719 | 4/1966 | Chelner | 73/756 |
| 3,335,381 | 8/1967 | Giovanni | 338/42 |
| 3,587,322 | 6/1971 | Lobdell et al. | 73/756 |

Primary Examiner—Stewart J. Levy
Assistant Examiner—John E. Chapman, Jr.
Attorney, Agent, or Firm—Craig & Burns

[57] ABSTRACT

A high pressure transducer, particularly for ballistic pressure measurements, with a sensor part, with a sealing part formed thereon and with a hollow mounting screw surrounding the sensor part with a clearance. The sensor part can be inserted together with the sealing part into a threaded mounting aperture in the component to be examined, whereby the sealing surface of the sealing part comes into sealing contact with a seating surface of the mounting aperture. The hollow mounting screw presses on the sealing part and produces the force necessary for sealing. The sealing surface of the sealing part is located somewhat ahead of a membrane portion while the sealing part is connected relatively elastically with the sensor part by means of a narrow web. The force flux lines produced by the sealing force are restricted in their effect substantially to the sealing part and do not reach the sensor element received in the sensor part; as a result thereof, a substantial independence of the measures values from the mounting conditions is attained.

19 Claims, 4 Drawing Figures

HIGH PRESSURE TRANSDUCER

The present invention relates to a high pressure transducer with a body member for securement in a mounting aperture provided in a structural component, with a sensor part connected with the body member and having a membrane portion for actuation of a sensor element and a means for forming a seal between the transducer and the mounting aperture.

In the technology, the measurement of pressure changes in the ranges from 0 to 1000 and 0 to 10,000 bar constitutes a special field, which ballistics experts in particular have intensively studied for several decades. In hydraulics, peak pressure values of up to 2,000 bar occur in injection processes in diesel engines. In the more recent pulse-cutting processes, hydraulic pressure peaks of up to 4,000 bar occur. However, pressures which go beyond these values are encountered almost exclusively in the development of explosives and in ballistics.

The present invention is therefore concerned in particular, but not exclusively, with pressure transducers for the determination of such higher pressures. One preferred field of use is thus represented by ballistic pressure measurements, in order to determine the pressure changes in rifles and guns during the firing of rounds. Such measurements are necessary for research purposes in the further development of barrels and rounds. For the development of charges, corresponding measurements are carried out in so-called pressure bombs. Another area of use is represented by high pressure measurements in fluid media. In all cases, operations are involved which last a few milliseconds and exhibit pressure amplitudes of up to 10,000 bar.

For over 100 years, such measurements have been carried out with the help of copper strain elements, which continue to be used even today in munitions acceptance. For about 20 years, this measuring technique has concentrated increasingly on electronic measuring methods with piezoelectric transducers. The piezo measuring technique has proved to be practically unique for these high-stressed dynamic uses, because of the extremely high resolution which permits to follow in fractions of a bar, the initial ignition process in the pressure range of a few bars as also the main combustion process with pressures up to 10,000 bars. Additionally, the piezo effect, as a volume effect in piezo crystals, allows measurements practically without deformation since the quartz crystals of relatively large dimensions which are used, exhibit very advantageous elasticity properties and possess substantially higher compressive strengths than constructions with highest quality steels. The membrane portions of such transducers thus undergo minimal bending, as a result of which a high useful life is attained.

For the pressure-tight mounting of such transcuers in a pressure container, the mounting apertures or bores required therein as also the transducer dimensions have been largely standardized in recent years, particularly after NATO had issued certain standards and specifications. Thus, in the main, two kinds of sealing arrangements have become standardized:
1. Transducer with shoulder seal;
2. Transducer with blind-hole seal.
The mounting threads are:
M10 or exceptionally M12 in Europe,
⅜ USFC in USA.

In Europe, transducers with shoulder seals are used almost exclusively, whereas in USA blind-hole seals are generally preferred. NATO specifies transducers with shoulder seals.

In view of the very flat pressure pulses with unusually high amplitudes, the sealing question plays a major role. The smallest leakage traces at a seal produces flash flame pressure pulses, as a result of which the transducer burns out after a few firings and thus becomes unusable. Often lapped seating- or sealing-surfaces are specified, for which no additional sealing means in the form of sealing rings are required. However, after each transducer disassembly, a subsequent lapping of the seating surfaces is necessary. Thin copper rings are therefore used frequently, which at times are difficult to remove from the seating surfaces. For over 10 years, self-adjusting steel sealing rings according to the German Pat. No. 17 75 646 have proved themselves, which ensure a completely satisfactory sealing. A torque of 10 Nm is sufficient for the secure seating of the transducer, without having to fear any loosening. Other transducers without such sealing rings require torques of up to 60 Nm, which has as a consequence corresponding deformations of the sealing surfaces.

FIG. 1, which will be referred to in greater detail hereinafter, illustrates a typical known piezoelectric high pressure transducer with a shoulder seal. In view of the high sealing torques during installation, no transducers have been available on the market up till now, whose sensitivity is not influenced by the mounting operation. This is based on the fact that the force flux lines introduced or established in the transducer during mounting are transmitted through sensitive sensor parts, whereby deformations are also transmitted to the membrane parts of the transducer. Depending upon the micro-construction of the sealing part, a different sensitivity thus results for each mounting or installation, so that it is often impossible to achieve a satisfactory measuring accuracy and reproducibility.

In contrast thereto, the present invention is based upon the task of providing a transducer of the type in question, which is practically insensitive to different sealing torques.

A solution to this problem, according to the present invention, which is particularly suitable for the measurement of pressures in fluid media, is characterized in that the sensor part with its membrane portion is arranged relative to or is displaced from the means forming the seal between the transducer and the mounting aperture by such a distance that the force flux lines stemming from the sealing forces which are produced during the sealing of the transducer relative to the mounting bore, are substantially kept away from the sensor part.

According to a further feature of the present invention, a tubular extension with an external thread for screwing into the mounting aperture can be provided on and ahead of the sensor part, whereby the tubular extension is adapted to be brought with its sealing surface into sealing engagement with a seating surface in the mounting aperture.

Another preferred solution of the problem underlying the present invention is characterized by a flange-like sealing portion connected to or integral with the sensor part in the area of the membrane portion, which sealing portion is pressed by a mounting screw surrounding the body member into sealing engagement with a seating surface on the mounting aperture so that the force flux lines from the sealing forces which are produced during the sealing of the transducer, are kept substantially away from the sensor part.

Since, with the latter transducer, practically no further structural parts are involved ahead of the membrane portion, it offers special advantages in use for ballistic pressure measurements. In this connection, it is known in principle in connection with transducers having a shoulder seal, to provide in a central area of a body member a peripheral flange with a relatively large axial extent, which rests or abuts with one seating surface on a shoulder seating surface of the mounting aperture, whereas a sleeve screwed into the mounting aperture is in engagement with the opposite seating surface of the flange in order to press the flange into sealing engagement with the shoulder seating surface of the mounting aperture. A sensor part in surface contact with the flange wall region of the body member is inserted into the thickened wall part of the body member forming the flange. This has as a consequence that any deformation of the flange caused by the sealing forces has an effect upon the sensitive sensor part and the force flux lines resulting from the sealing forces not only pass through the flange, but also through the sensor part. In the present invention, in contrast thereto, the effects of the sealing forces are substantially restricted to the flange-like sealing portion connected to the sensor part in the area of the membrane portion, which, according to a further feature of the present invention, can preferably be elastically connected with the sensor part. Since the hollow mounting screw according to the invention surrounds the sensor part of the body member preferably with a clearance, deformations of the hollow mounting screw, when being screwed into the mounting aperture, cannot have any effect on the sensor part.

Both types of the aforementioned transducer constructions according to the present invention serve for the measurement of rapidly varying pressure changes with high peak values and are characterized both by a high constancy of their operating sensitivity as also by a long useful life, since in both cases the sensitive membrane portions of the transducer are not affected by the sealing forces or are affected thereby only to a nominal insignificant extent. The sensitivity of the transducers is not influenced either by the level of the tightening or contact torque values, when being screwed into the mounting aperture, or by the elastic limiting conditions of the mounting aperture or by ageing effects. This ensures that both the measuring accuracy itself as also the reproducibility thereof remain unaltered independently of the prevailing installation conditions.

These and other objects, features and advantages of the present invention will become more apparent from the following description when taken in conjunction with the accompanying drawing which shows, for purposes of illustration only, several embodiments in accordance with the present invention and wherein.

Figure 1:
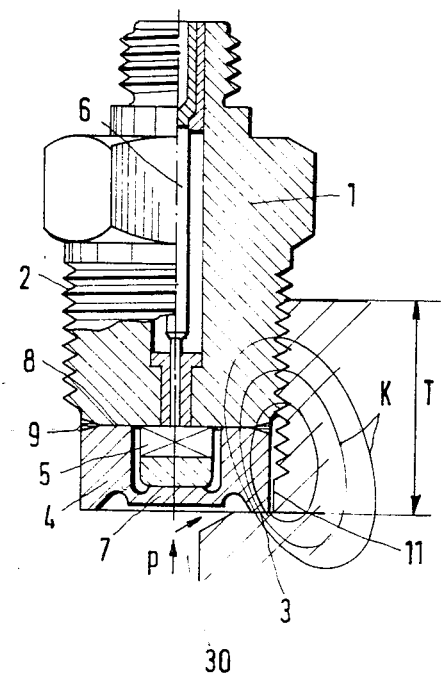
FIG. 1 is a view, partly in longitudinal cross section, of a prior art high pressure transducer with a blind-bore seal.

The terms "upper and "lower" used in the following description relate to the positions of the parts as shown in the drawing.

Referring now to the drawing wherein like reference numerals are used throughout the various views to designate corresponding parts, and more particularly to FIG. 1, this Figure illustrates a known high pressure transducer with a blind-bore seal. This kind of seal is simpler to manufacture, but has the disadvantage that the membrane portion 7 cannot be installed flush with the pressure chamber surface, so that an auxiliary inlet or access bore 30 is always necessary. Because of the requisite high accuracy of the boring, surface-lapping and thread-cutting operations, the special tools required therefor are usually supplied by the manufacturer of the transducer.

As illustrated, the known transducer comprises a mounting body 1 with an external screw thread 2 for screwing into a threaded mounting aperture 11 in such a manner that the free lower end face 3 of a sensor part 4 secured to the body member comes into sealing engagement with a seating surface of the auxiliary bore 30.

A sensor element 5 is arranged in a recess in the sensor part 4, as illustrated, which preferably comprises one or more suitable piezo crystals, whose electrical charges are transmitted to the outside by way of a signal lead 6 extending through the body member 1. The free lower end face of the transducer is formed partially by an inwardly-thickened membrane portion 7, which transmits the pressure signal produced by the media pressure p as a force to the sensor element 5 and is preferably manufactured in one piece with the sensor part 4. The sensor part 4 itself is welded to the body member 1 by means of its upper contact surface 8 facing the body member 1, as indicated at 9. In this type of transducer construction, the medium pressure p acts on the membrane portion 7 up to the sealing surface 3.

The pressure force transformation thus results in an extremely complex arrangement. The necessary abutment or contact force of the sealing surface 3 at the seating surface of the auxiliary bore 30 is produced by screwing the body member into the aperture portion T. Sealing torques of 30 to 60 Nm are necessary therefor. Correspondingly, these very high pre-stressing forces produce force flux lines K, as indicated, which extend to the sensitive sensor parts. The pressure medium p also causes a change in the static force flux lines K, which once again has a reaction on the sensitivity of the transducer. The thermal components of a gas pulse have a further substantial influence on the membrane portion 7 and produce additional stresses in the membrane portion 7, which can result in dynamic errors in measurement.

Not represented in the illustration of the force flux lines K in FIG. 1 are the torsional forces, which likewise extend from the thread 2 up to the sealing surface 3 and thus also stress the sensor part and therewith influence the measurements. These torsional forces are very largely dependent on external conditions, such as for example, the lubrication of the thread 2 and the mode of tightening and vary much even more strongly than the illustrated longitudinal and transverse forces K.

The sensor part 4 is traversed over the entire height by the force flux lines K and the torsional forces, owing to the particular construction. Correspondingly, substantial disadvantageous influences on the stressing of the sensor element 5 and the membrane portion are produced. An additional problem is the upper large separation or supporting surface 8, which, depending on the realization of the weld, leads to greater or lesser clearance resiliencies which should be avoided to the greatest possible extent.

Figure 2:
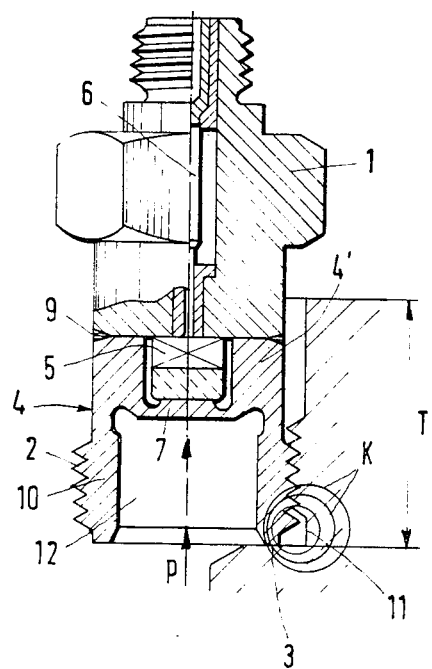
FIG. 2 is a view similar to FIG. 1 of a high pressure transducer with a setback sensor part according to a first embodiment of the present invention.

FIG. 2 illustrates a high pressure transducer according to a first embodiment of the present invention, which is particularly suitable for the measurement of pressures in fluid media. As illustrated, the body member 1 is peripherally connected or welded to the sensor part generally designated by reference numeral 4 at 9. According to the present invention, a lower tubular extension 10 is formed on the sensor part 4, so that the membrane portion 7 no longer forms the lower external end face of the transducer, as in the known construction previously described in conjunction with FIG. 1, but is set back or displaced upwardly by a suitable distance with respect to the lower sealing surface 3 at the tubular extension 10.

The tubular extension 10 carries on its external periphery a screw thread 2, by means of which the transducer can be screwed into the mounting aperture 11 of the component to be examined, in order to bring the end or sealing surface 3 of the tubular extension 10 into sealing engagement with the seating surface of the mounting aperture. The pressure p thus acts upon the membrane portion 7, by way of the space 12 surrounded by the tubular extension 10. In this embodiment of the present invention, the force flux lines K, which extend from the lowermost thread turns to the sealing surface 3, no longer pass through the memebrane portion 7 and the housing portion 4' for the sensor element 5 but pass substantially only through parts of the transducer which do not exert any influence on the sensor element 5, so that it is assured in this embodiment that the taking of the measured values is not influenced by the magnitude of the tightening torque values and the like during the installation of the transducer in the mounting aperture. As to the remaining constructional parts, the transducer according to FIG. 2 corresponds substantially to the construction already described in connection with FIG. 1 so that a detailed description of these parts is dispensed with.

For ballistic measurements, the provision of a hollow space 12 is not desired, especially as it is not possible with the embodiment according to FIG. 2 to exclude that during the tightening operation, a torque is still conducted by way of the sensor part 4, which could lead to disadvantageous displacements in the sensor element. This disadvantage is alleviated with the embodiment of the invention according to FIG. 3, which far-reachingly eliminates the hollow space and provides special measures in order to keep the tightening torques away from the sensor element 5.

Figure 3:
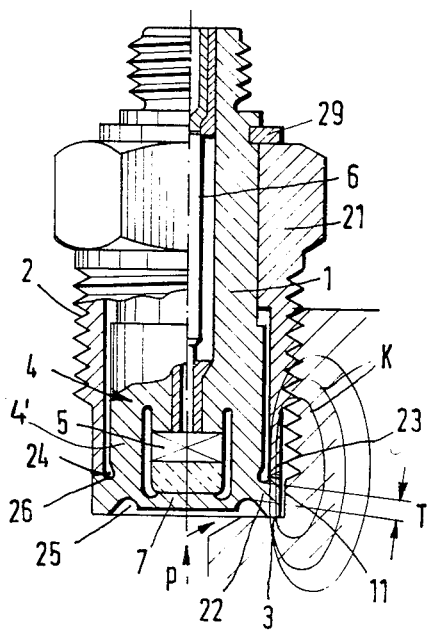
FIG. 3 is a view similar to FIG. 1 of a high pressure transducer with a blind-bore seal according to a second preferred embodiment of the present invention.

As shown in FIG. 3, the transducer according to the preferred embodiment of the present invention comprises again a main body member 1, which, however, is preferably—integrally connected in this embodiment with the sensor part 4. At its lower end, the sensor part 4 carries a membrane portion 7 which is exposed to the media pressure p, which actuates a sensor element 5, located in the housing portion 4' of the sensor part, of the kind described in connection with FIGS. 1 and 2. A signal lead 6 passing through the body member 1 conducts to the outside the charges produced at the sensor element 5.

According to the present invention, the main body member 1, as shown, is surrounded externally by a hollow screw 21 which, with its external thread 2, can be screwed relatively deeply into the mounting aperture 11 of the component undergoing examination. At its lower end surface 23, the mounting screw 21 is in contact with a flange-like sealing portion 22 extending horizontally outwardly from the housing portion 4' of the sensor part 4 or is rigidly connected thereto by way of a weld seam 24. In this embodiment of the invention, the tubular extension 10 shown in FIG. 2 is thus avoided and is replaced in its function by the sealing portion 22, on which no screw thread is provided. By the provision of the sealing portion 22 constructed in this way, a substantial part of the force flux lines K is already kept away from the housing portion 4' of the sensor part 4, however a still further improvement can be achieved in this connection in that the connection between the sealing portion 22 and the housing portion 4' of the sensor part 4 is constructed elastic according to the present invention. For this purpose, recessed grooves 25 and 26 are provided at suitable points between the sealing portion 22 and the housing portion 4' of the sensor part 4, as illustrated, which provide a weakened connection of the sealing portion 22 to the housing portion 4' of the sensor part 4 and thus prevent the force flux lines from being able to stray from the sealing portion 22 into the housing portion 4' of the sensor part 4.

The extent to which the sealing portion 22 can be weakened by the grooves 25 and 26 and the connection between the sensor part 4 and the sealing portion 22 can be reduced in its thickness T, depends on the pressure p to be measured, which has to be sealed off, as well as on the other conditions of use. Tests have demonstrated that the thickness T of the connecting web between the sealing portion 22 and the sensor part 4 preferably should not be greater than about 25% of the face diameter of the transducer.

A further advantage of the provision of a hollow screw 21 is that the constructional height of the sealing portion 22 and its connection to the sensor part 4 can be very small, as a result of which the force flux lines extend only over a short distance in the vicinity of the sensor part 4 and correspondingly can have only a slight effect on the housing portion 4' of the sensor part 4 or its membrane portion 7.

It may also be mentioned that, as shown, the hollow screw 21 peripherally contacts the main body member 1 only in an upper area, whereas within the area of the sensor part 4 a space is provided between the main body member 1 and the hollow screw 21, so that any deformations of the hollow screw cannot affect the sensor part 4.

As can be further seen in FIG. 3, a groove may be provided in the upper area of the main body member 1 for the reception of a securing ring 29, which further fixes the hollow mounting screw 21.

It may also be mentioned that, in the transducer according to FIG. 3, similarly to the embodiment according to FIG. 1, the membrane portion 7 respectively the housing portion 4' of the sensor part 4 is somewhat displaced upwardly with respect to the sealing surface 3, which ensures that the pressure medium can act over the entire membrane portion 7 and the latter is subjected to the measuring pressure over a precisely defined surface area.

Figure 4:
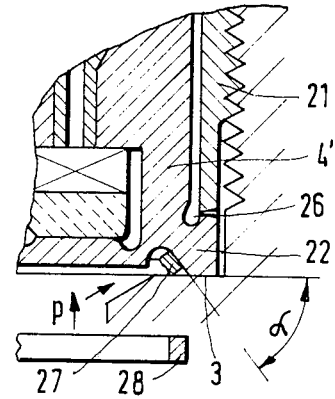
FIG. 4 is a partial longitudinal cross sectional view of a modification of the transducer shown in FIG. 3.

FIG. 4 shows a partial view of a modified high-pressure transducer according to the present invention, with a blind-hole seal. Instead of the flat sealing surface 3 shown in FIG. 3, a surface with an inclined area is provided in this embodiment which forms a conical surface that lies at a predetermined angle α with respect to the plane defined by the seating surface of the mounting aperture. During the installation of the transducer, a metal sealing ring 27, described in detail in German Pat. No. 17 75 646, comes into engagement with this conical surface. Prior to the installation, this metal sealing ring 27 is a tubular section 28, see FIG. 4 below, which by elastic deformation during the installation assumes the configuration shown in FIG. 4 and provides a completely satisfactory seal even with very small tightening torques. Moreover, FIG. 4 shows in further detail the construction of the elastic connection of the sealing part 22 to the sensor part 4 by means of the recessed grooves 25 and 26.

The provision according to the present invention of an elastic zone between the mounting arrangements and the sensor parts provides a completely satisfactory separation of the force flux lines K, produced by the mounting and sealing forces, from the housing portion 4' of the sensor part 4. According to the present invention, high pressure transducers are thus provided which give accurate non-falsified measuring results independently of the always varying installation conditions.

It will be understood that the present invention can be altered and modified in accordance with the teachings herein without departing from the scope thereof. For example, instead of the preferred use of piezo crystals as the sensor elements, resistance-measuring elements, such as strain gauges or piezo-resistive sensors, can also be provided.

Consequently, the present invention is not limited to the details shown and described herein but encompass all those changes and modifications thereof, as known to a person skilled in the art, and we therefore do not wish to be limited to these details but intend to cover all such changes and modifications thereof as are encompassed by the scope of the appended claims.

We claim:

1. A high pressure transducer for ballistic application having an externally threaded portion and operable to be threadably secured directly in a mounting aperture having an internally threaded portion and provided in a ballistic structural component, comprising a body member provided with said externally threaded portion, a sensor part connected with the body member and having a membrane portion, a sealing portion and a housing portion, said membrane portion serving to actuate a sensor element located within the housing portion of the sensor part, means adapted to form a shoulder seal between mutually abutting surfaces of the sealing portion and the mounting aperture, said seal being located ahead of the threaded portions, and further means in the transducer operable to substantially keep away from the membrane portion and housing portion, the force flux lines stemming from the tightening and sealing forces which are produced when sealing the transducer relative to the structural component, said further means being formed at least in part by displacement of the housing portion and the membrane portion with respect to the sealing portion so that said force flux lines are substantially kept away from the housing and membrane portions.

2. A transducer according to claim 1, wherein the sensor part is set back with its membrane portion and its housing portion with respect to the sealing portion.

3. A transducer according to claim 1, wherein the sensor part includes a tubular extension forming part of the sealing portion and provided with an external thread for screwing into the mounting aperture, the tubular extension including a sealing surface operable to be brought into sealing engagement with a seating surface provided in the mounting aperture.

4. A high-pressure transducer for ballistic application having an externally threaded portion and operable to be threadably secured directly in a mounting aperture having an internally threaded portion and provided in a ballistic structural component, comprising a main body member, a sensor part connected to the body member and having a membrane portion, a sealing portion and a housing portion, said membrane portion serving to actuate a sensor element located within the housing portion of the sensor part, means adapted to provide a shoulder seal between mutually abutting surfaces of the sealing portion and the mounting aperture, said seal being located ahead of the threaded portions, said sealing portion being flange-like and extending generally radially from the sensor part within the area of the membrane portion, and further means operable to substantially keep away from the housing portion and membrane portion the force flux lines stemming from the tightening and sealing forces which are produced when sealing the transducer relative to the structural component, including a threaded hollow mounting means provided with said externally threaded portion and surrounding the main body member and operable to urge said flange-like sealing portion into sealing engagement with a seating surface in the mounting aperture so that said force flux lines are substantially kept away from the housing and membrane portions.

5. A transducer according to claim 4, wherein the sealing surface of the sealing portion is located ahead of the membrane portion of the sensor part.

6. A transducer according to claim 5, wherein the sealing portion is elastically connected with the housing portion.

7. A transducer according to claim 6, wherein the thickness of a connecting web between the sealing portion and the housing portion is less than about 25% of the diameter of the transducer at the end thereof exposed to the pressure.

8. A transducer according to claim 7, wherein the hollow mounting means surrounds the main body member with clearance at least in the region of the housing portion.

9. A transducer according to claim 8, wherein the sealing portion is connected with the hollow mounting means by a weld.

10. A transducer according to claim 9, wherein the sealing portion has a conical area with a cone-shaped surface for receiving a metal sealing ring which is deformed self-sealingly during installation without deforming the sealing surface of the transducer.

11. A transducer according to claim 10, wherein the hollow mounting means is secured with respect to the main body member by means of a securing ring so that the main body member is removable from the mounting aperture.

12. A transducer according to claim 4, wherein the sealing portion is elastically connected with the housing portion.

13. A transducer according to claim 12, wherein the thickness of a connecting web between the sealing portion and the housing portion is less than about 25% of the diameter of the transducer at the end thereof exposed to the pressure.

14. A transducer according to claim 4, wherein the hollow mounting means surrounds the main body member with clearance at least in the region of the housing portion.

15. A transducer according to claim 14, wherein the sealing portion is connected with the hollow mounting means by a weld.

16. A transducer according to claim 4, wherein the sealing portion has a conical area with a cone-shaped surface for receiving a metal sealing ring which is deformed self-sealingly during installation without deforming the sealing surface of the transducer.

17. A transducer according to claim 4, wherein the hollow mounting means is secured with respect to the main body member by means of a securing ring so that the main body member is removable from the mounting aperture.

18. A transducer according to claim 4, wherein the sealing portion is connected with the hollow mounting means by a weld.

19. A transducer according to claim 18, wherein the hollow mounting means is secured with respect to the main body member by means of a securing ring so that the main body member is removable from the mounting aperture.

* * * * *